United States Patent
Meloun et al.

(10) Patent No.: US 9,491,452 B2
(45) Date of Patent: Nov. 8, 2016

(54) CAMERA CALIBRATION

(71) Applicant: Intel Corporation, Santa Clara, CA (US)

(72) Inventors: Martin Meloun, Svinare-Halouny (CZ); Daniel C. Middleton, Independence, MN (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/498,801

(22) Filed: Sep. 26, 2014

(65) Prior Publication Data

US 2016/0073102 A1   Mar. 10, 2016

Related U.S. Application Data

(60) Provisional application No. 62/046,788, filed on Sep. 5, 2014.

(51) Int. Cl.
*H04N 17/00* (2006.01)
*H04N 17/02* (2006.01)
*G06K 9/62* (2006.01)
*H04N 5/225* (2006.01)
*G06T 7/00* (2006.01)

(52) U.S. Cl.
CPC .......... *H04N 17/002* (2013.01); *G06K 9/6201* (2013.01); *G06K 9/6267* (2013.01); *G06T 7/0018* (2013.01); *H04N 5/2258* (2013.01); *G06T 2207/10016* (2013.01)

(58) Field of Classification Search
CPC .... H04N 17/002; H04N 17/02; H04N 5/217; G06T 7/0018

USPC ........................................................ 348/187
See application file for complete search history.

(56) References Cited

U.S. PATENT DOCUMENTS

| 8,401,276 | B1 | 3/2013 | Choe et al. | |
|---|---|---|---|---|
| 2006/0203098 | A1* | 9/2006 | Henninger, III | ... G06K 9/00771 348/211.99 |
| 2007/0031004 | A1* | 2/2007 | Matsui | ............... G06T 7/0034 382/103 |

(Continued)

FOREIGN PATENT DOCUMENTS

KR   20090065198 A   6/2009

OTHER PUBLICATIONS

Keaffaber et al., "Multi-Target Camera Calibration", U.S. Appl. No. 14/498,793, filed Sep. 26, 2014, 57 Pages.

(Continued)

*Primary Examiner* — Michael Lee
(74) *Attorney, Agent, or Firm* — International IP Law Group, P.L.L.C.

(57) ABSTRACT

Techniques for image calibration are described herein. The techniques may include detecting features on a set of images, describing features on the set of images, determining a match between features of the image sets, determining a shift on the matched features based on camera positions associated with the matched features, determining a first homography between the camera positions and the determined shift, and determining a second homography based on a re-projection of three-dimensional features back to the cameras.

25 Claims, 6 Drawing Sheets

(56) References Cited

U.S. PATENT DOCUMENTS

| | | | |
|---|---|---|---|
| 2007/0253618 A1 | 11/2007 | Kim et al. | |
| 2010/0238351 A1* | 9/2010 | Shamur | G11B 27/036 |
| | | | 348/598 |
| 2011/0293142 A1* | 12/2011 | van der Mark | G06T 7/0028 |
| | | | 382/103 |
| 2013/0070108 A1 | 3/2013 | Aerts et al. | |
| 2014/0146144 A1 | 5/2014 | Li et al. | |

OTHER PUBLICATIONS

International Search Report, PCT No. PCT/US2015/044021, mailed on Nov. 19, 2015, 3 pages.

* cited by examiner

CAMERA CALIBRATION

CROSS REFERENCE TO RELATED APPLICATIONS

The present application claims the benefit of the filing date of U.S. Provisional Patent Application No. 62/046,788, filed Sep. 5, 2014, which is incorporated herein by reference.

TECHNICAL FIELD

This disclosure relates generally to camera calibration. More specifically, the disclosure describes an ad hoc calibration process performed as images are captured.

BACKGROUND

Computing devices increasingly include one or more cameras, or other types of image capture devices, to enable a user to capture images. For example, many smartphones and tablet computing devices include cameras operable to capture images in various scenarios. Many camera systems may be calibrated during manufacturing. However, because of camera system tolerances, such as shifting, noise, and other image quality factors, calibration on-the-fly or ad hoc as images are captured during regular use may help in maintaining a resilient consumer product for daily use.

DETAILED DESCRIPTION

The subject matter disclosed herein relates to techniques for using factory calibration data as a part of an active image correction process that runs whenever a depth camera system is being used on a computing device. The on-board calibration provides many benefits. For example, calibration may be refined from the factory settings based on an actual scene such that disparity results in a usable image. In some aspects, image alignment may be corrected using features extracted from the image so that they are rectified. In some aspects, scene depth estimates may be provided to automate parameter selection for disparity. In a scene having small amounts of noise and good lighting, ad hoc calibration may increase rectification for small changes in camera rotation and intrinsic properties of a given camera that might change.

Figure 1:
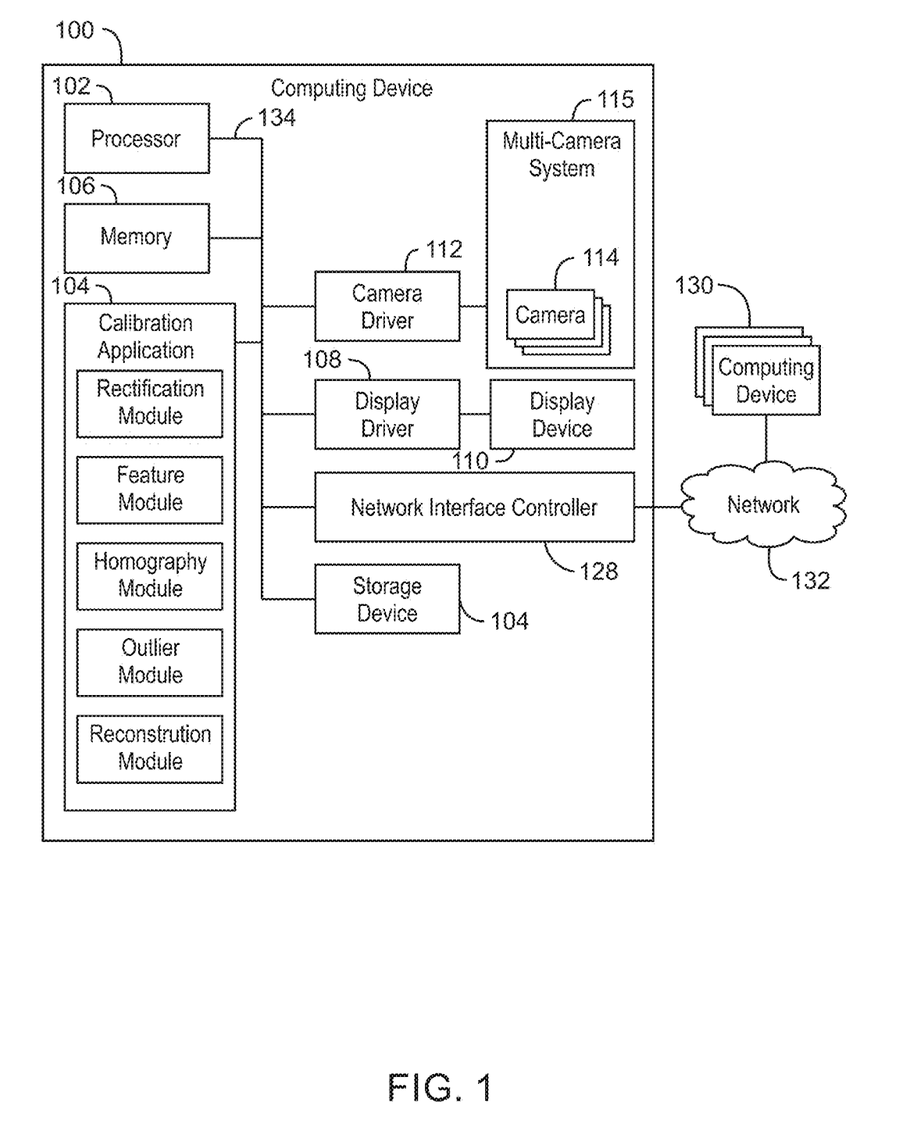
FIG. 1 is a block diagram of a computing device having calibration application to calibrate images at the computing device.

FIG. 1 is a block diagram of a computing device having calibration application to calibrate images at the computing device. The computing device 100 may include a processor 102, a storage device 104 including a non-transitory computer-readable medium, and a memory device 106. The computing device 100 may include a display driver 108 configured to operate a display device 110 to render images at a graphical user interface (GUI), a camera driver 112 configured to operate one or more camera devices 114 of a multi-camera system 115.

The computing device 100 includes modules of a calibration application 116 configured to calibrate images captured by one or more of the camera devices 114. As illustrated in FIG. 1, the modules include a feature module 118 and a homography module 120. In some embodiments, the calibration application 116 includes a rectification module 122, an outlier module 124, and a reconstruction module 126. The modules 118, 120, 122, 124, and 126 may be logic, at least partially comprising hardware logic. In some examples, the modules 118, 120, 122, 124, and 126 may be instructions stored on a storage medium configured to be carried out by a processing device, such as the processor 102. In yet other examples, the modules 118, 120, 122, 124, and 126 may be a combination of hardware, software, and firmware. The modules 118, 120, 122, 124, and 126 may be configured to operate independently, in parallel, distributed, or as a part of a broader process. The modules 120, 122, 124 may be considered separate modules or sub-modules of a parent module. Additional modules may also be included. In any case, the modules 118, 120, 122, 124, and 126 are configured to carry out operations.

The feature module 118 is configured to detect features on a set of images. The set of images may be at least two images captured from different camera devices 114. In embodiments, the set of images may be at least three images captured from at least three different camera devices 114. The feature module 118 may detect features using a feature detection algorithm. For example, the feature module 118 may implement a corner detection method, such as a Features from Accelerated Segment Test (FAST) method. The feature module 118 is also configured to describe features on the set of images. A feature is an item of information of each image. The description of each feature may be implemented using feature descriptor method such as a Fast Retina Keypoint (FREAK) method. Once features have been detected and described, features that are common to all of the captured images, or image sets, are matched. In embodiments, the matching is performed using a brute force matcher and simple constraints.

The homography module 120 is configured to determine a shift related to the matched features based on camera positions of each camera used to capture an image in the set of images. In projective geometry, a homography may be an isomorphism of projective spaces induced by an isomorphism of vector spaces from which the projective spaces are derived. The homography module 120 may determine a first homography between camera positions and the determined shift. The homograph y module 120 may also determine a second homography based on a re-projection of three-dimensional (3D) features back to the camera devices 114.

In some embodiments, the calibration application 116 includes a rectifier module 122. The rectifier module 1122 is configured to use factory calibration data. For example, the rectifier module 122 may rectify the set of images with an original homography provided by a manufacturer. The original homography may be stored on the storage device 104. The rectification may be performed before the feature detection of the feature module 118 in order to enhance the results of the calibration.

In some embodiments, the calibration application 118 further includes an outlier module 124. The outlier module 124 is configured to discard outliers based on feature match angles that are above a predetermined threshold. The outlier module 124 may also discard outliers based on a feature match size above a predetermined threshold. In the case of at least three camera devices 114 used to capture the image set, the outlier module 124 is configured to discard feature matches that do not occur in images from at least three of the camera devices 114. The outlier module 124 may be further configured to determine a scale of shift indicating the difference of feature coordinates between image sets divided by a displacement associated with each image captured. It may be important to note that the modules discussed above and/or below may be implemented as a single application, two or more modules may be combined to perform any given operation.

In some embodiments, the calibration application 116 includes a reconstruction module 126. The reconstruction module 126 may be configured to reconstruct the detected features in 3D, wherein the second homography is homography between original feature coordinates from manufacturer calibration and feature coordinates based on the re-projection of the 3D reconstruction to one or more cameras. In some cases, the 3D reconstruction estimates scene depth.

The calibration discussed above may be referred to herein as ad hoc or on-the-fly calibration. This references the implementation of calibration as images are captured at the computing device 100, rather than merely relying on calibration performed by a manufacturer.

In embodiments, the computing device 100 includes a network interface controller 128 component configured to connect the computing device 100 to remote computing devices 130 via a network 132. In some scenarios, the network interface controller 128 is an expansion card configured to be communicatively coupled to a system bus 134. In other scenarios, the network interface controller 128 may be integrated with a motherboard of a computing device, such as the computing device 100. In embodiments, the calibration application 116 may be carried out, and/or stored on, a remote computing device, such as one of the remote computing devices 130. For example, images captured can be sent to remote computing devices 130, such as servers having a calibration application similar to the calibration application 116. The calibration may be provided to the computing device 100 from one or more of the remote computing devices 130 via the network 132.

The computing device 100, as referred to herein, may be a mobile computing device wherein components such as a processing device, a storage device, and a display device are disposed within a single housing. For example, the computing device 100 may be a tablet computer, a smartphone, a handheld videogame system, a cellular phone, an all-in-one slate computing device, or any other computing device having all-in-one functionality wherein the housing of the computing device houses the display was well as components such as storage components and processing components.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The main processor 102 may be connected through a system bus 134 (e.g., Peripheral Component Interconnect (PCI), Industry Standard Architecture (ISA), PCI-Express, HyperTransport®, NuBus, etc.) to components including the memory 106 and the storage device 104.

The camera driver 112 is configured to direct the one or more camera devices 114 to capture visual information, or in other words, images of the image set that are to be used to calibrate the camera devices 114. By providing calibration post-manufacturing, the calibration may take advantage of real-world images to enhance the calibration. In some examples, the calibration enhances calibration data previously performed during manufacturing. However, the calibration may also be performed without reference to manufacturer calibration data. The camera devices 114 may be a plurality of video cameras configured to capture real-time video, or still images. In some embodiments, calibration may be used for a single camera device 114 wherein the calibration is performed for images captured at different locations. In some aspects, the computing device 100 includes a depth sensing camera, either as an additional component or as an integrated component of the camera devices 114, configured to determine a distance between the computing device 100 and one or more physical surfaces.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
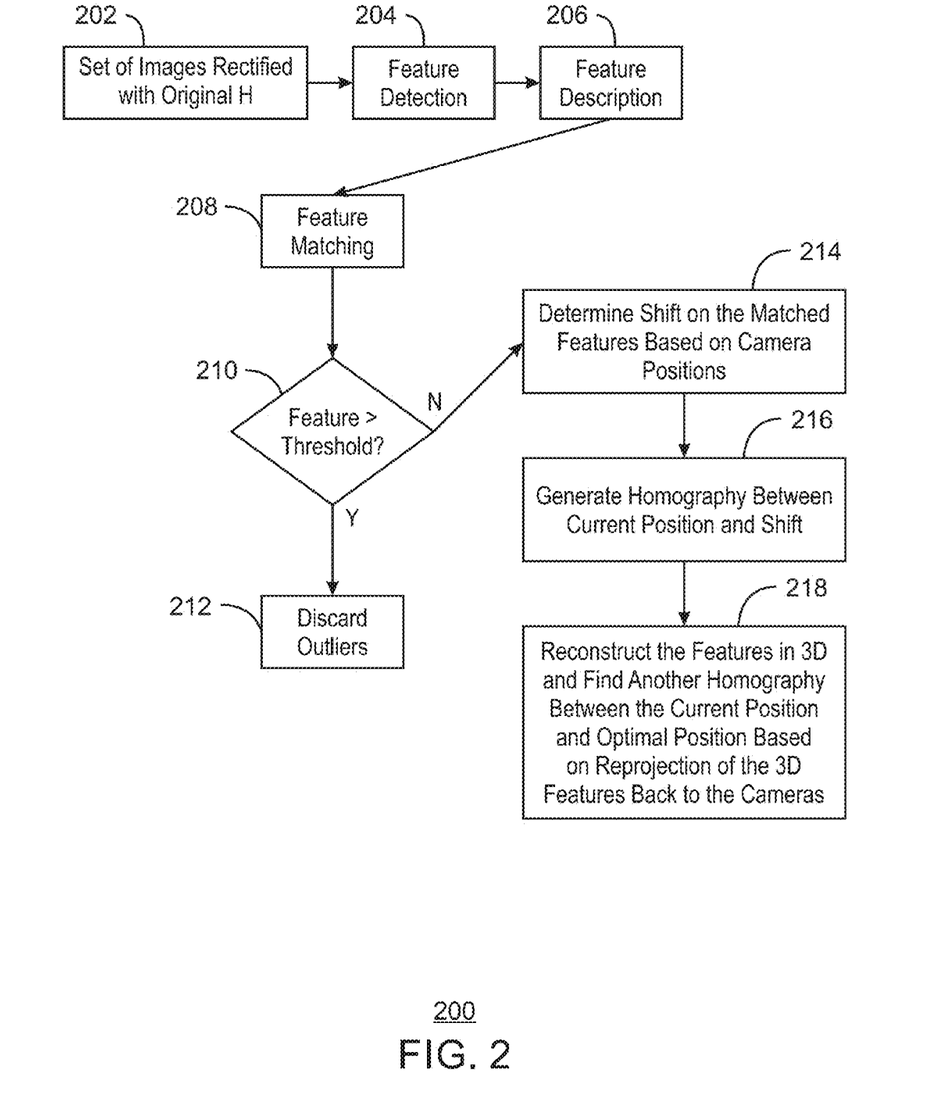
FIG. 2 is process flow diagram illustrating calibration performed at the computing device.

FIG. 2 is process flow diagram illustrating calibration performed at the computing device. At 202 the set of images are rectified with an original homography "H." As discussed above, the original homography may be data provided by calibration performed during manufacturing. The original homography data may be stored on computing device, such as the computing device 100 of FIG. 1. At 204, feature detection is performed, and at 206, feature description is performed. As discussed above, feature detection at 204 may be performed using FAST and feature description may be performed using FREAK. At 208, features occurring in more than one image of the image set are matched. Outliers are identified as features that meet or exceed a threshold at 210. As discussed above in regard to FIG. 1, a threshold may be based on size, angle, and the like. Although not illustrated in FIG. 2, an outlier may also be identified based on whether or not a given feature occurs in at least three cameras. If the matched features exceed the threshold, they are identified as outliers and discarded at 212. The matched features that do not exceed the threshold at 210 will be used to determine a shift that should be used to calibrate the camera devices at 214. The shift may be based on the camera positions, or relative displacement from each other. A homography between the current position of the camera devices and the shift determined at 214 is generated at 216. In some cases, the homography is generated based on an iterative method such as a random sample consensus (RANSAC). The features may be reconstructed in 3D at 218, and another homography between the current position and an optimal position based on re-projection of the 3D features back to the camera devices is found.

In some embodiments, the features are matched between a reference camera and other cameras. On every corresponding feature set, a scale of shift is determined. The scale of the shift may be the difference of a feature's coordinates between the camera and the reference camera divided by the distance of the two cameras. A feature may have to match at least on 3 cameras to be useable. In other words the scale of their shift may be required to match on all cameras 114. In this case, an average scale may be determined, ideal coordinates may be marked on the non-reference cameras as the coordinates of the feature on the reference camera plus the direction from the reference camera to the other camera. Thus, the average scale—the difference between these ideal coordinates and the current coordinates—or in other words, the error may be plotted on a graph, such as the graph illustrated in FIG. 3 below.

The first homography found is between current coordinates and ideal coordinates for all features, using RANSAC to discard outliers, and for every camera such that the RANSAC will run individually on each camera. It may be important to note that a common component of the error is removed such that when the reference camera is out of alignment then it itself will be fixed.

Figure 4:
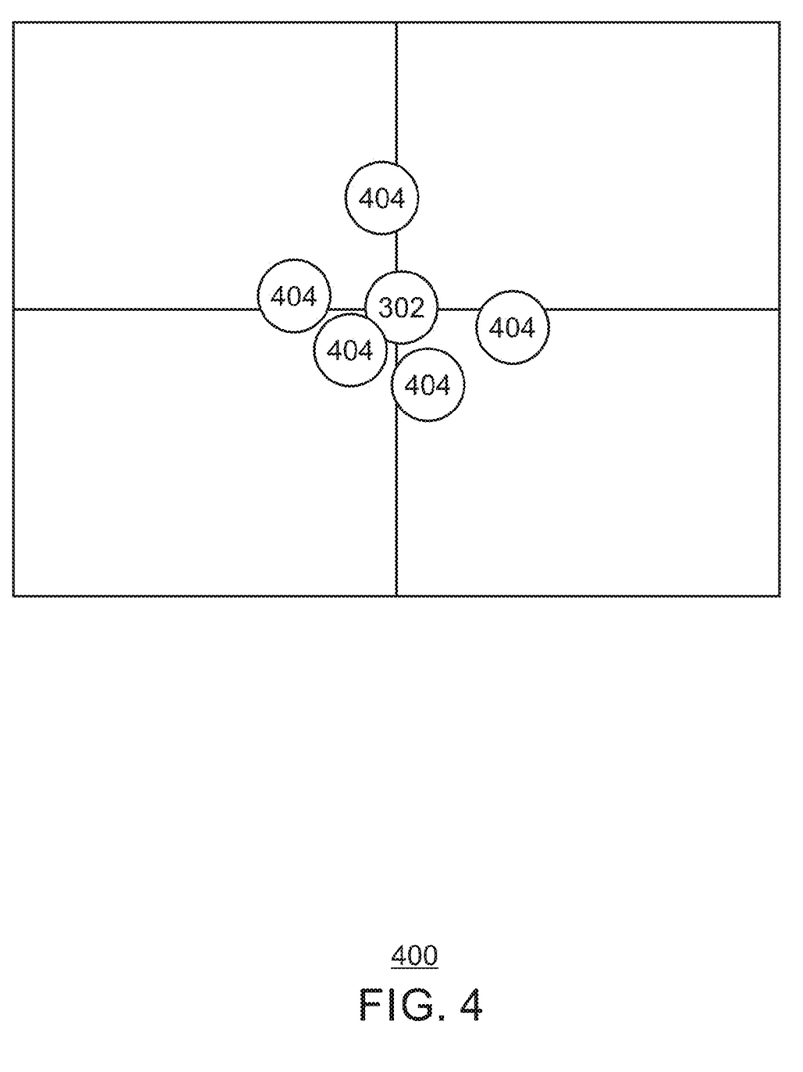
FIG. 4 is a graph illustrating features existing in captured images after calibration of camera devices.

The newly found homography is applied on the detected features on all cameras. This may result in an estimated rectified camera matrix. The features are reconstructed in 3D and errors resulting from 3D reconstruction error may be discarded. The 3D reconstructed features are re-projected back onto the cameras and a homography is determined between their current coordinates and the coordinates obtained from re-projection. This may again be done with RANSAC as it improves camera matrices and works with all cameras at once. A homography correction matrix H2 is determined as the homography between original feature coordinates and the feature coordinates based on re-projection of the 3D reconstruction back to the cameras. A green dot center graph, discussed below in regard to FIG. 4, illustrates how the correspondence changed when H2 is applied.

The output of the ad hoc, on-the-fly, calibration may include 3D reconstructed features estimating scene depth, and a homography correction matrix H2. The H2 homography correction matrix may be derived based on the equations discussed below. For example, the rectified camera matrix may be KP, indicated in Equation 1:

$$K_P = H \times K \times R \qquad \text{Eq. 1}$$

However, when calibration changes over time, we don't have K and R anymore, but slightly modified $K_O$ and $P_O$. So, to get $K_P$ again, a new homography matrix $H_O$ may need to be generated in order to obtain a new $K_P$, as indicated in Equation 2:

$$K_{P'} = H_O \times K_O \times R_O \qquad \text{Eq. 2}$$

However, $H_O$ may not be known. When the images from an image set are rectified with an original H, images for an unknown matrix $K_{PO}$ are generated, as indicated by Equation 3:

$$K_{PO} = H \times K_O \times R_O \qquad \text{Eq. 3}$$

The difference between $K_{PO}$ and $K_P$, is observable based on features alignment which may result in $H_2$ as indicated in Equation 4:

$$K_P \sim H_2 \times H \times K_O \times R_O \qquad \text{Eq. 4}$$

This may be an approximation. And at the end $K_P$ is indicated by Equation 5:

$$K_P = H \times K \times R \sim H_2 \times H \times K_O \times R_O \qquad \text{Eq. 5}$$

In Eq. 5, $K_O$ and $R_O$ are unknown matrices. However, these are not necessarily needed for determining $H_2$, and as an original K will be assumed to remain constant.

Figure 3:
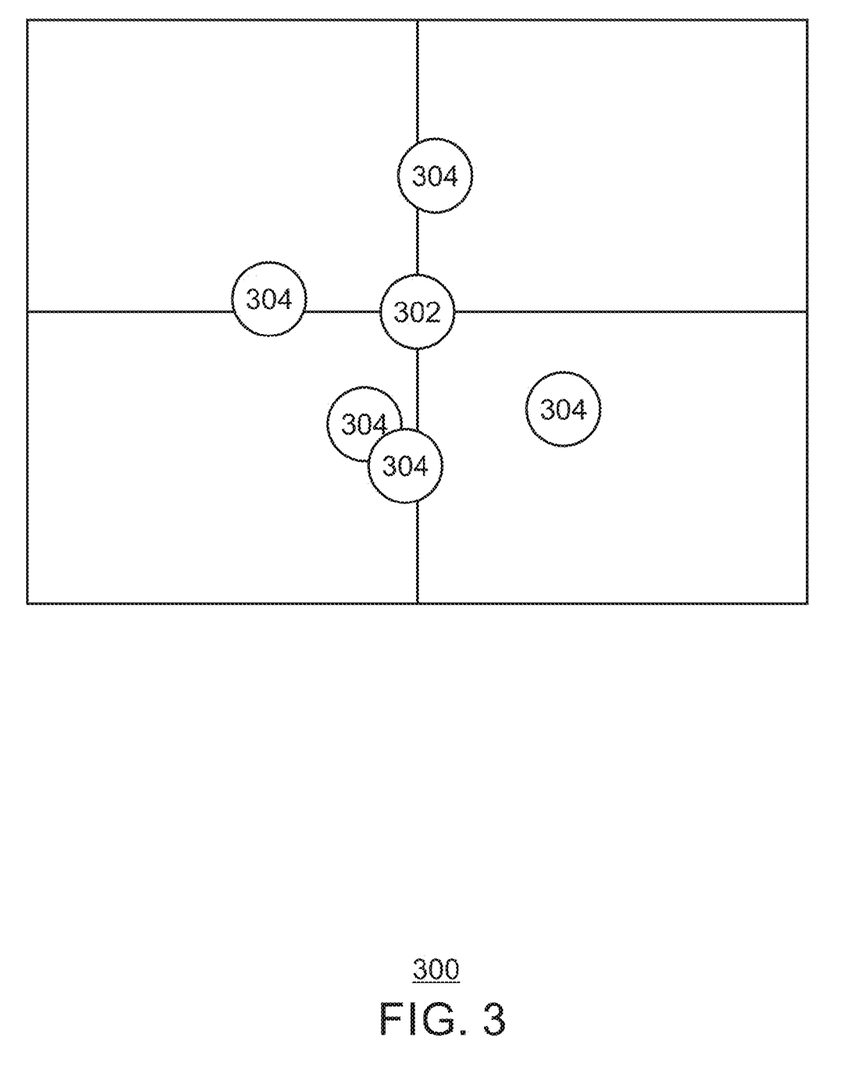
FIG. 3 is a graph illustrating features existing in captured images before calibration of camera devices.

FIG. 3 is a graph illustrating features existing in captured images before calibration of camera devices. In FIG. 3, cameras were used to capture images. An ideal is represented at 302. The ideal dot 302 is where the vectors would be if the multi-camera system 114 were calibrated. Outliers, represented as the dots 304, and indicate a corresponding error.

FIG. 4 is a graph illustrating features existing in captured images after calibration of camera devices. Similar to FIG. 3, the ideal dot 302 is illustrated, but in contrast to FIG. 3, outliers 404 are much closer to the ideal dot 302. In reference to FIG. 3 and FIG. 4, the calibration may result in an improved correspondence.

Figure 5:
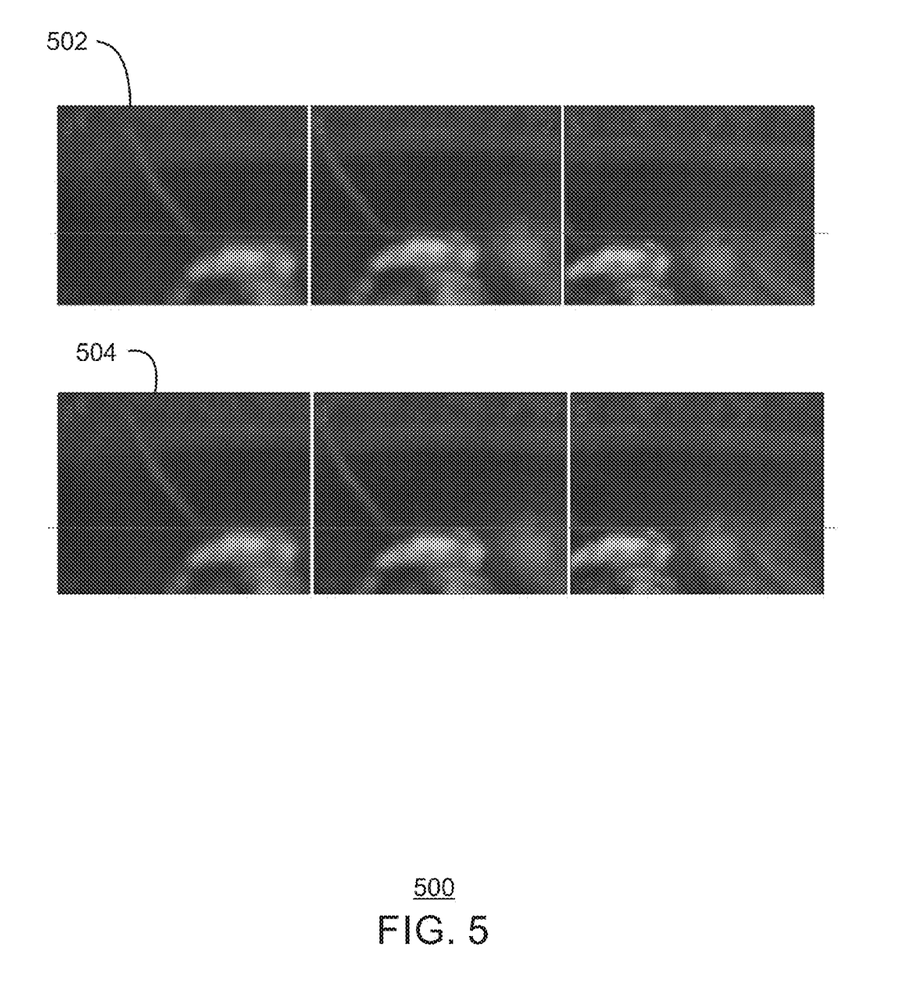
FIG. 5 is a photograph illustrating alignment correction that may occur during calibration.

FIG. 5 is a photograph illustrating alignment correction that may occur during calibration. In 502, the cameras do not align properly, whereas in 504, the cameras do align properly.

Figure 6:
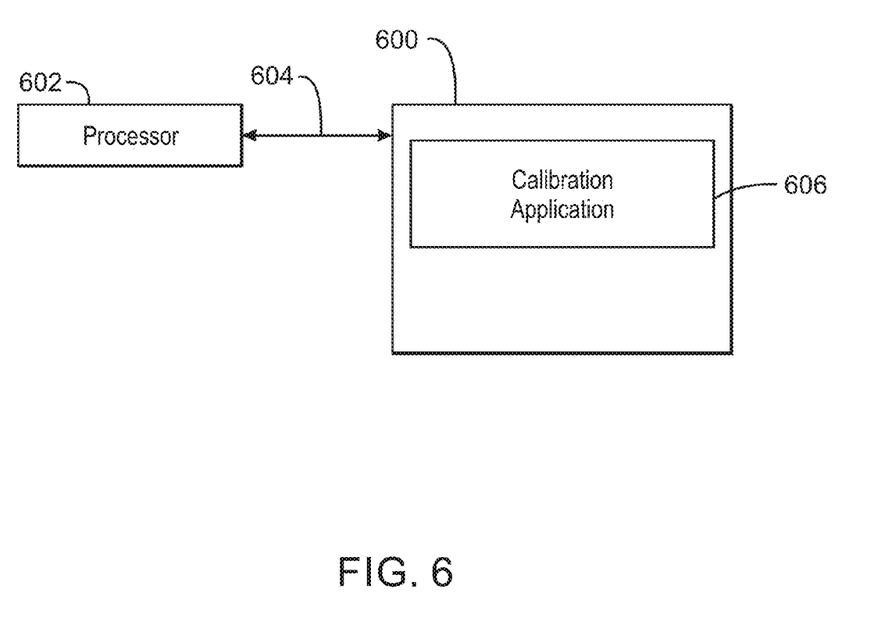
FIG. 6 is a block diagram depicting an example of a computer-readable medium configured to calibrate image capturing devices.

FIG. 6 is a block diagram depicting an example of a computer-readable medium configured to calibrate image capturing devices. The computer-readable medium 600 may be accessed by a processor 600 over a computer bus 604. In some examples, the computer-readable medium 600 may be a non-transitory computer-readable medium. In some examples, the computer-readable medium may be a storage medium, but not including carrier waves, signals, and the like. Furthermore, the computer-readable medium 600 may include computer-executable instructions to direct the processor 602 to perform the steps of the current method.

The various software components discussed herein may be stored on the tangible, non-transitory, computer-readable medium 600, as indicated in FIG. 6. For example, a calibration application 606 may be configured to detect features on a set of images, describe features on the set of images, determine a match between features of the image sets, determine a shift on the matched features based on camera positions associated, determine a first homography between the camera positions and the determined shift, and determine a second homography based on a re-projection of three-dimensional features back to the cameras.

Examples may include subject matter such as a method, means for performing acts of the method, at least one machine-readable medium including instructions that, when performed by a machine cause the machine to performs acts of the method, or of an apparatus or system for projecting a virtual image according to embodiments and examples described herein.

Example 1 includes a system for image calibration. The system includes a processing device and modules to be implemented by the processing device. The modules include a feature module and a homography module.

The feature module is to detect features on a set of images, and describe features on the set of images. The feature module may also be configured to determine a match between features of the image sets.

The homography module is configured to determine a shift on the matched features based on camera positions. The homography module is further configured to determine a first homography between the camera positions and the determined shift. The homography module is further configured to determine a second homography based on a re-projection of three-dimensional features back to the camera.

Example 2 includes a method for image calibration. The method includes detecting features on a set of images, describing features on the set of images, determining a match between features of the image sets, and determining a shift on the matched features based on camera positions associated with the matched features.

The method of Example 2 may also include determining a first homography between the camera positions and the determined shift. The method may further include determining a second homography based on a re-projection of three-dimensional features back to the cameras.

In some cases, the method of Example 2 may be carried out by an appropriate means for calibration. In some cases, the means includes a computer-readable medium configured to carry out the method of Example 2.

Example 3 includes an apparatus for image calibration. The apparatus may include a means for detecting features on a set of images, describing features on the set of images, determining a match between features of the image sets, and determining a shift on the matched features based on camera positions associated with the matched features.

The apparatus of Example 3 may also include a means for determining a first homography between the camera positions and the determined shift. The means may also be configured for determining a second homography based on a re-projection of three-dimensional features back to the cameras.

Example 4 includes a computer-readable medium having code that, when executed by a processing device, cause the processing device to detect features on a set of images. The code may also cause the processing device to describe features on the set of images, determine a match between features of the image sets, and determine a shift on the matched features based on camera positions associated with the matched features. The code may further cause the processing device to determine a first homography between the camera positions and the determined shift, and a second homography based on a re-projection of three-dimensional features back to the cameras.

Example 5 includes an apparatus for image calibration having logic. The logic may be at least partially including hardware logic. The logic may be configured to perform a method including detecting features on a set of images, describing features on the set of images, determining a match between features of the image sets, and determining a shift on the matched features based on camera positions associated with the matched features.

The apparatus of Example 5 may also include a logic for determining a first homography between the camera positions and the determined shift. The logic may also be configured for determining a second homography based on a re-projection of three-dimensional features back to the cameras.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for image calibration, comprising:
a processing device; and
modules to be implemented by the processing device, the modules comprising:
a feature module to:
detect features on a set of images;
describe features on the set of images;
determine a match between features of the image sets; and
a homography module to:
determine a shift on the matched features based on camera positions;
determine a first homography between the camera positions and the determined shift;
reconstruct the detected features in three-dimensions; and
determine a second homography based on a re-projection of the three-dimensional features back to a plurality of cameras.

2. The system of claim 1, further comprising a rectifier module configured to rectify the set of images with an original homography from a manufacture calibration, wherein the rectification is performed before the feature detection of the feature module.

3. The system of claim 1, wherein the images of an image set comprise images each captured at a different camera comprising at least three cameras.

4. The system of claim 1, wherein the images of the image set comprise images captured at a single camera disposed at different positions.

5. The system of claim 1, further comprising an outlier module configured to:
discard outliers based on feature match angle above a predetermined threshold; and
discard outliers based on a feature match size above a predetermined threshold.

6. The system of claim 5, wherein the outlier module is further configured to discard outliers where a feature match occurs on less than three cameras.

7. The system of claim 5, wherein the outlier module is further configured to determine a scale of the shift indicating the difference of feature coordinates between image sets divided by a displacement associated with each image captured.

8. The system of claim 1, wherein the second homography is homography between original feature coordinates from manufacturer calibration and feature coordinates based on the re-projection of the three dimension reconstruction to one or more cameras.

9. The system of claim 8, wherein the three dimension reconstruction estimates scene depth.

10. The system of claim 1, wherein the modules are operable ad hoc as images are captured.

11. A method for image calibration, comprising:
detecting, with a processing device, features on a set of images;
describing features on the set of images;
determining a match between features of the image sets;
determining a shift on the matched features based on camera positions associated with the matched features;
determining a first homography between the camera positions and the determined shift; reconstructing the detected features in three-dimensions; and
determining a second homography based on a re-projection of the three-dimensional features back to a plurality of cameras.

12. The method of claim 11, further comprising rectifying the set of images with an original homography from a manufacture calibration, wherein the rectification is performed before the feature detection of a feature module.

13. The method of claim 11, wherein the images of an image set comprise images each captured at a different camera comprising at least three cameras.

14. The method of claim 11, wherein the images of the image set comprise images captured at a single camera disposed at different positions.

15. The method of claim 11, further comprising:
discarding outliers based on feature match angle above a predetermined threshold; and
discarding outliers based on a feature match size above a predetermined threshold.

16. The method of claim 11, further comprising discarding outliers where a feature match occurs on less than three cameras.

17. The method of claim 11, further comprising determining a scale of the shift indicating the difference of feature coordinates between image sets divided by a displacement associated with each image captured.

18. The method of claim 11, wherein the second homography is homography between original feature coordinates from manufacturer calibration and feature coordinates based on the re-projection of the three dimension reconstruction to one or more cameras.

19. The method of claim 18, wherein the three dimension reconstruction estimates scene depth.

20. The method of claim 11, wherein the method is operable ad hoc as images are captured.

21. A non-transitory, computer readable medium including code, when executed, to cause a processing device to:
detect features on a set of images;
describe features on the set of images;
determine a match between features of the image sets;
determine a shift on the matched features based on camera positions associated with the matched features;
determine a first homography between the camera positions and the determined shift;
reconstruct the detected features in three-dimensions; and
determine a second homography based on a re-projection of the three-dimensional features back to a plurality of cameras.

22. The computer readable medium of claim 21, further comprising code, when executed, to cause the processing device to rectify the set of images with an original homography from a manufacture calibration, wherein the rectification is performed before the feature detection of a feature module.

23. The computer readable medium of claim 21, wherein the images of an image set comprise images each captured at a different camera comprising at least three cameras.

24. The computer readable medium of claim 21, wherein the images of the image set comprise images captured at a single camera disposed at different positions.

25. The computer readable medium of claim 21, further comprising code, when executed, to cause the processing device to:
discard outliers based on feature match angle above a predetermined threshold; and
discard outliers based on a feature match size above a predetermined threshold.

* * * * *